July 18, 1933.  G. A. KNAAK  1,918,341
FLUID METER
Filed April 24, 1930  4 Sheets-Sheet 1

Inventor:
George A. Knaak

Inventor:
George A. Knaak

July 18, 1933.  G. A. KNAAK  1,918,341
FLUID METER
Filed April 24, 1930  4 Sheets-Sheet 4

Inventor:
George A. Knaak
by: [signature], Atty.

Patented July 18, 1933

1,918,341

UNITED STATES PATENT OFFICE

GEORGE A. KNAAK, OF MILWAUKEE, WISCONSIN

FLUID METER

Application filed April 24, 1930. Serial No. 446,897.

This application contains subject matter common to both this application and my co-pending application Serial No. 392,334, filed September 13, 1929.

The invention relates to fluid meters.

The fluid meter to which the invention applies in particular has a receiving reservoir, an inlet valve for connecting the reservoir to a source of fluid under pressure, an outlet valve for connecting the reservoir to a receiver, and pressure responsive mechanism for operating the valves alternately to admit fluid into said reservoir from said source and then discharge the same from said reservoir into said receiver.

An object of the invention is to provide a fluid meter which may be employed either to measure the quantity of fluid delivered or to limit the fluid pressure in the receiver, or both.

Another object is to provide a positive shut-off between the source of high pressure fluid and the receiver.

Another object is to provide means to indicate each filling of the reservoir.

Another object is to provide means to regulate the utimate pressure in the receiver.

Another object is to provide a meter which is efficient and precise in operation.

Another object is to provide a meter which is strong and durable.

According to one phase of the invention, the reservoir is connected to the source of fluid and to the receiver by valves which are operated alternately by pressure responsive mechanism to admit fluid into the reservoir and to discharge the same therefrom, the arrangement being such that when one valve is being opened, the other is being closed, and vice versa.

According to another phase of the invention, each filling of the reservoir is indicated by a signalling or indicating device.

The invention may be employed to measure fluids, such as the quantity of natural or artificial gas delivered to the point of consumption or distribution and control the delivery thereof, or to limit the ultimate fluid pressure in a receiver, such as the air pressure in a pneumatic tire.

A meter embodying the invention is shown in the accompanying drawings in which the views are as follows.

Figs. 1 to 5

Figure 1:
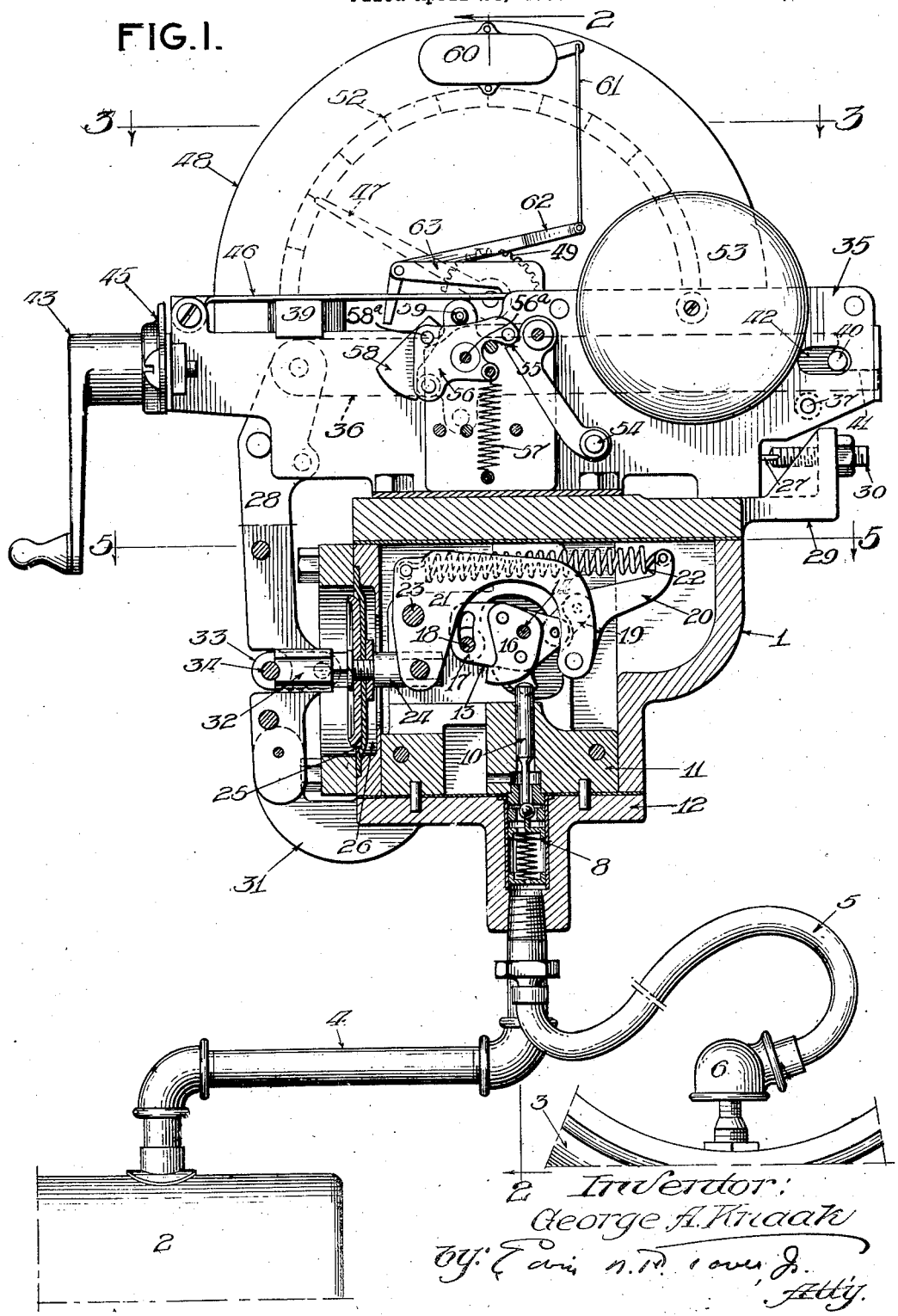
Fig. 1 is a vertical longitudinal section on the line 1—1 of Fig. 2, showing the meter connected between a source of high pressure fluid and a receiver and the operating mechanism in position to admit fluid into the meter.
Figure 2:
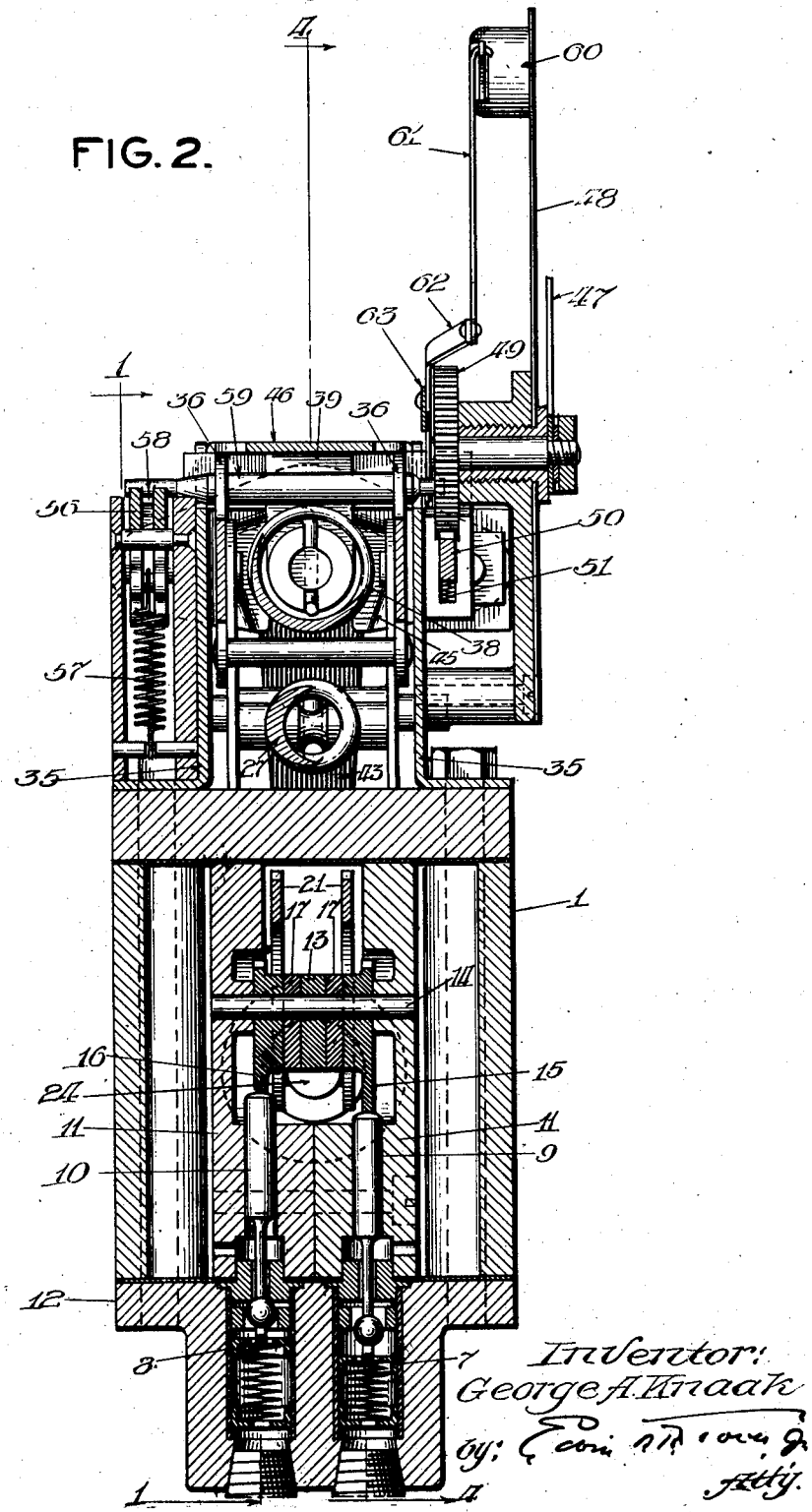
Fig. 2 is a vertical transverse section on the line 2—2 of Fig. 1.

The meter has a reservoir 1 for connection between a source of fluid under pressure and a receiver and is ordinarily employed to deliver compressed air from a tank 2 to a pneumatic tire 3.

The reservoir 1 is connected to the tank 2 by a pipe 4, and to the tire 3 by a service hose 5 which is provided at the outer end thereof with a valve chuck 6 for attachment to the valve stem of the tire.

The flow of air through the reservoir 1 is controlled by an inlet valve 7 and an outlet valve 8 which are operated by pressure responsive valve operating mechanism.

The valves 7 and 8 are self-closing and the valve operating mechanism is so arranged that when one valve is being opened, the other is being closed, and vice versa.

When the inlet valve 7 is opened, compressed air will flow from the tank 2 into the reservoir 1 until the pressure therein reaches a predetermined maximum and operates the pressure responsive mechanism to release the inlet valve 7 and allow the same to close and to open the outlet valve 8.

The air in the reservoir 1 will then flow into the tire 3 until the pressure in the reservoir 1 falls below a predetermined minimum, whereupon the pressure responsive mechanism will be operated to allow the outlet valve 8 to close and open the inlet valve 7, and start a second cycle of operation.

The meter thus delivers, during each cycle of operation, a measured charge of air which is equal to the quantity of air required to raise the pressure in the reservoir 1 from the minimum to the maximum.

The pressure responsive mechanism will operate the valves alternately to deliver successive measured charges of compressed air to the tire until the pressure therein reaches a predetermined maximum.

If the meter is employed to measure the quantity of gas or other fluid delivered to a receiver for consumption or distribution, the pressure responsive mechanism continues to operate and deliver measured quantities of the fluid as long as the same is being consumed or distributed.

Whenever consumption or distribution ceases and the pressure in the receiver reaches a predetermined maximum, the meter ceases delivering fluid to the receiver until a sufficient quantity of the fluid therein has been used or distributed to reduce the pressure in the receiver below the predetermined maximum and permit the pressure responsive mechanism to operate again.

The valves 7 and 8 are provided with plungers 9 and 10, respectively, which are guided by supports 11 arranged within the reservoir 1 and supported by the base 12 thereof.

The supports 11 are connected to each other at the bottoms thereof and shaped to provide a space between the same to accommodate snap action mechanism for operating the valves.

The plungers 9 and 10 are depressed alternately by an actuator 13 which is arranged between the supports 11 upon a pin or shaft 14 carried thereby.

The actuator 13 is oscillated by snap action mechanism and has a cam 15 to engage the plunger 9 and open the inlet valve 7 and a cam 16 to engage the plunger 10 and open the outlet valve 8.

The cams 15 and 16 are so arranged relatively to each other that the valves move as one valve, and consequently operate simultaneously. In other words, when one valve is being opened, the other is being closed and vice versa.

The actuator 13 may be a unitary element but preferably the cams 15 and 16 are formed separately to enable the same to be properly heat treated and a pair of arms 17 are arranged between the cams and rigidly connected thereto.

The movement of the actuator 13 in either direction is limited by a stop pin 18 which is carried by the supports 11 and extends through alined slots formed in one end of the arms 17.

The actuator 13 is oscillated by a link 19 which has one end thereof pivoted as at 19a between the other ends of the arms 17 and its other end pivoted as at 19b between the two sides of a lever 20 intermediate the ends thereof.

The lever 20 has its lower end pivoted between the two sides of a lever 21 at the rear end thereof and its upper end connected to the lever 21 by a tension spring 22 which urges the link 19 toward the actuator shaft 14.

The pivot 19a is on a plane above a horizontal line through the actuator shaft 14 of the actuator 13, when the valves are in one position, and below said line, when the valves are in another position.

The lever 21 is shaped to partially surround the actuator 13 and is pivoted at its front end to the supports 11 by a shaft 23.

A connecting rod 24 is pivoted to the front end of the lever 21 below the shaft 23 and connected to a diaphragm 25 which is arranged in the front wall of the reservoir 1 and closes an opening 26 therein.

Figure 4:
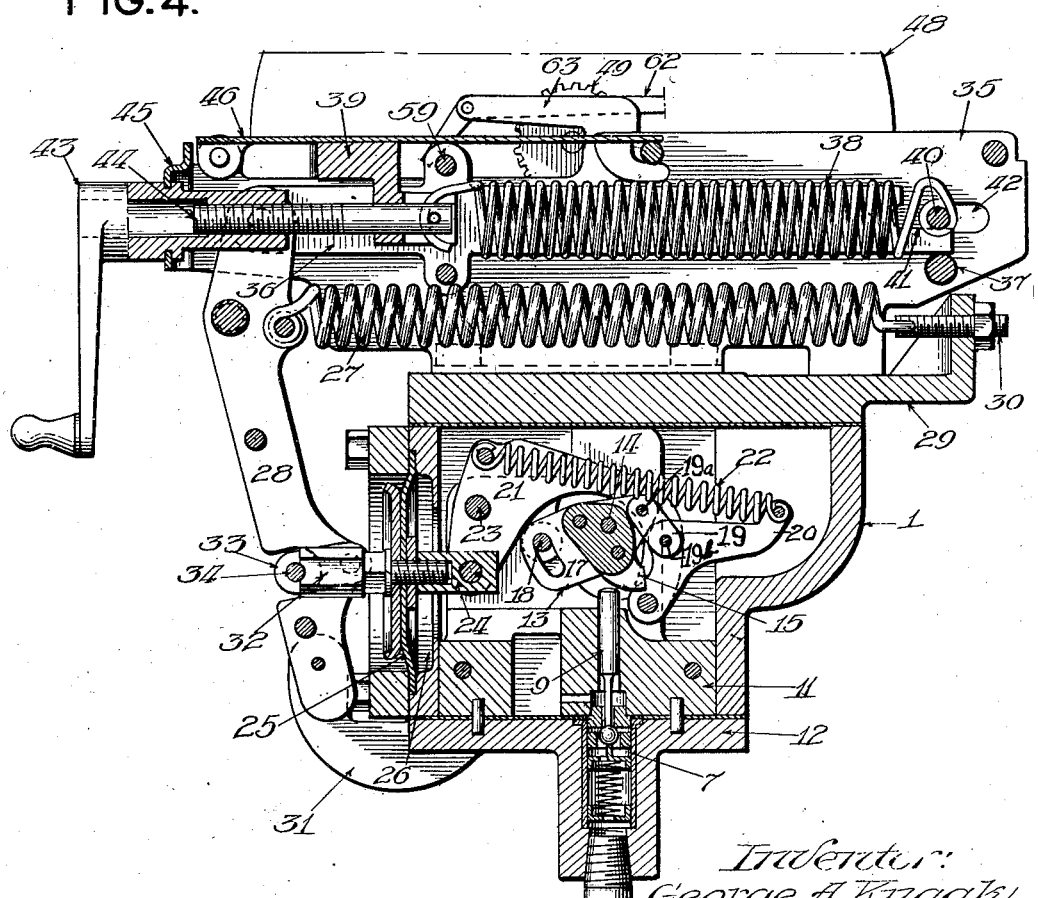
Fig. 4 is a vertical longitudinal section taken in the plane of the line 4—4 of Fig. 2, but showing the operating mechanism in position to discharge fluid from the meter.
Figure 5:
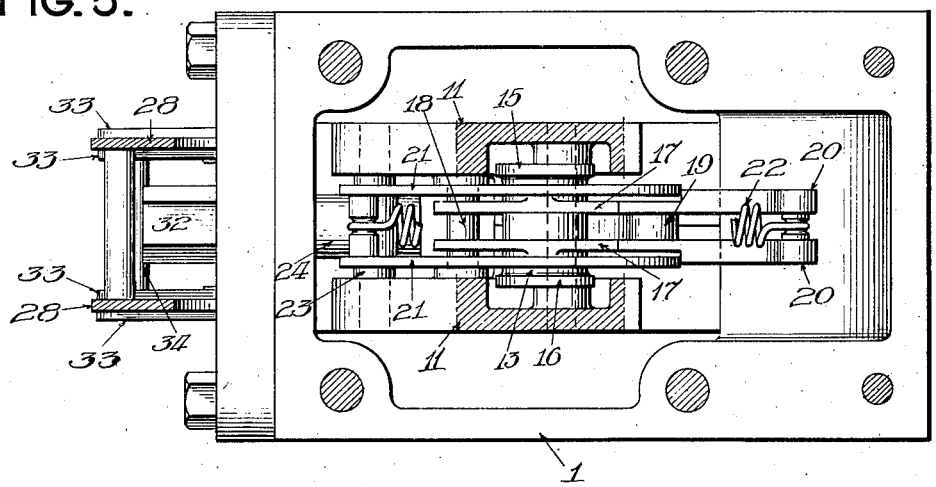
Fig. 5 is a plan view, partly in section, taken on the line 5—5 of Fig. 1.

The diaphragm 25 is forced outwardly by fluid pressure within the reservoir 1 to move the snap action mechanism into the position shown in Fig. 4.

The outward movement of the diaphragm 25 is opposed by an operating spring 27 which is connected at one end to a bifurcated operating lever 28 and at its other end to the top 29 of the reservoir 1 by adjusting screw 30.

The air in the tank 2 is ordinarily under high pressure, relatively to the pressure required in the tire 3, and the tension of the operating spring 27 is adjusted to limit the maximum pressure in the reservoir 1, for instance, a pressure of 100 lbs. per square inch.

The operating lever 28 is pivoted at its lower end to brackets 31 carried by the base 12 and engages an abutment 32 carried by the diaphragm 25 in alinement with the connecting rod 24.

The operating lever 28 may have links 33 pivoted to each side at the inner edges thereof and joined to each other at the outer edge of the lever 28 by a pin 34 which engages the abutment 32 and transmits pressure thereto in a straight line.

The mechanism for regulating the ultimate pressure in the receiver is carried by a stationary frame 35 which is arranged upon the top 29 of the reservoir 1 and rigidly secured thereto.

A movable frame 36 is arranged within the stationary frame 35 and has its forward end pivoted to the operating lever 28 and its rear end supported by a roller 37 carried by the stationary frame 35.

A regulating spring 38 is arranged within the movable frame 36 and has its forward end connected to a carriage 39, which is supported upon the upper edges of the stationary frame 35, and its rear end connected to a pin 40 which is reduced in diameter at each end and supported in guideways 41 formed in the rear end of the movable frame 36.

The reduced ends of the pin 40 extend through slots 42 which are formed in the sides of the stationary frame 35 and allow a limited movement of the pin 40 longitudinally thereof.

The regulating spring 38 urges the ends of the pin 40 against the forward ends of the guideways 41 and tends to move the movable frame 36 forwardly against the action of the operating spring 27, that is, the initial forward movement of the operating lever 28 is opposed by the difference between the tensions of springs 27 and 38.

The tension of the regulating spring 38 is adjusted by a crank 43 which is threaded upon a screw 44 secured to the carriage 39.

The crank 43 is journaled in a plate 45 which is attached to each side of the stationary frame 35 at the forward end thereof and holds the crank against axial and lateral movement.

The carriage 39 is held against upward movement by a cover plate 46 which is arranged between the sides of the stationary frame 35 and connected thereto at the forward ends thereof to hold the same in spaced relation.

Figure 3:
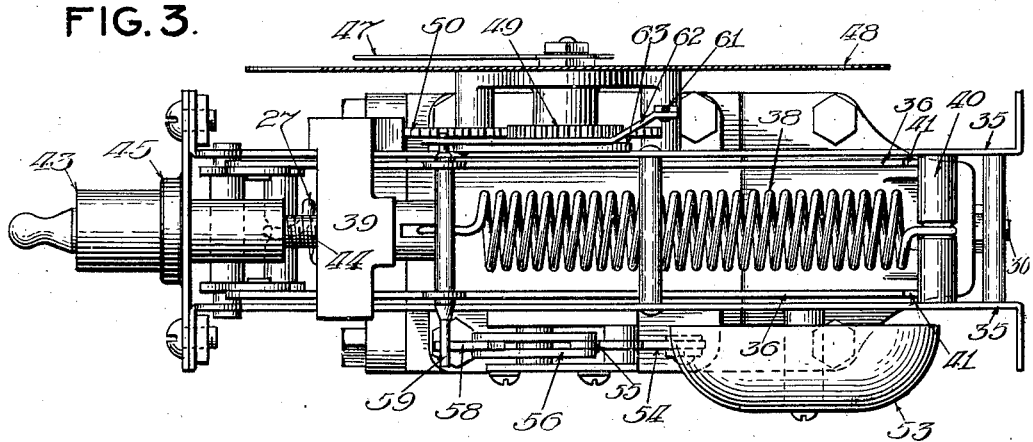
Fig. 3 is a sectional plan view on the line 3—3 of Fig. 1, the cover plate of the main frame being omitted.

The cover plate 46 has been omitted from Fig. 3 in order to expose the mechanism below the same.

The tension of the regulating spring 38 determines the minimum pressure required in the reservoir 1 to prevent the spring 27 from operating the snap action mechanism to open the inlet valve 7.

This minimum pressure and the ultimate pressure which can be obtained in the receiver are the same and are indicated by a pointer 47 upon a dial 48 carried by the stationary frame 35.

The pointer 47 is fixed for rotation with a gear 49 which meshes with a rack 50 attached to the carriage 39.

The rack 50 may be pivoted to the carriage 39 and urged by a spring 51 into engagement with the gear 49 to insure meshing of the teeth.

The dial 48 is provided with a scale 52 along which the pointer 47 moves as the crank 43 is rotated to vary the tension of the regulating spring 38, the pointer 47 indicating lower pressures as the tension of the spring 38 is increased and higher pressures as the tension is decreased.

The mechanisms are in the positions shown in Fig. 1 whenever the fluid pressure in the reservoir 1 is below the pressure indicated upon the scale 52 by the pointer 47 and the inlet valve 7 is open to admit compressed air from the tank 2.

An increase of the fluid pressure in the reservoir 1 causes the diaphragm to move outwardly and urge the operating lever 28 and the movable frame 36 forwardly against the action of the operating spring 27.

As the fluid pressure in the reservoir 1 increases and the frame 36 moves forwardly, the tension of the spring 38 decreases until the ends of the pin 40 engage the forward ends of the slots 42 and remove the influence of the spring 38 from the frame 36.

Further outward movement of the diaphragm 25 is then opposed by the full force of the spring 27.

As the diaphragm 25 moves outwardly, the connecting rod 24 swings the lever 21 upon its pivot 23 and depresses the inner end thereof.

This movement swings the link 19 upon its pivots and forces the upper end of the lever 20 against the action of the spring 22, until the pivots 19a and 19b of the link 19 are in horizontal alignment.

As the actuator 13 is pivoted upon its shaft 14, there is nothing to hold the parts in this position and the spring 22 jerks the lever 20 forwardly and rotates the actuator 13 upon its shaft 14, thus operating the valves 7 and 8 with a snap action.

While this action is extremely rapid, the cam 15 moves out of engagement with the plunger 9 and permits the spring in the inlet valve 7 to close the same before the cam 16 engages the plunger 10 and opens the outlet valve 8.

When the valve chuck 6 is applied to the valve stem of the tire 3 to open the valves therein, the air in the reservoir 1 flows into the tire 3 until the pressure in the reservoir 1 falls below the pressure indicated by the pointer 47.

As the fluid pressure in the reservoir 1 decreases, the operating spring 27 moves the operating lever 28 rearwardly until the ends of the guideways 41 pick up the ends of the pin 40 and add the influence of the spring 38 to the influence of the fluid pressure in the reservoir 1 in opposing the action of the spring 27.

When the fluid pressure in the reservoir 1 falls below the pressure indicated by the pointer 47, the operating spring 27 overcomes the fluid pressure upon the diaphragm 25 and the influence of the spring 38 and causes the connecting rod 24 to operate the snap action mechanism in the opposite direction to close the outlet valve and open the inlet valve and start a second cycle of operation.

The quantity of air which flows into the tire 3 during each cycle of operation is equal to the quantity of air required to raise the pressure in the reservoir 1 from the pressure at which the inlet valve 7 opens to the pressure at which the outlet valve 8 opens.

The cycles of operation follow each other in rapid succession until a sufficient number of measured charges of air have been delivered to the tire 3 to produce a pressure therein corresponding to the pressure indicated by the pointer 47 upon the dial 48.

This same pressure then prevails in the reservoir 1 and is too great for the spring 27 to overcome and the meter ceases to function.

Each filling of the reservoir 1 is preferably indicated by a visible or audible signal and may also be registered.

The meter is shown provided with a bell 53 which is carried by the stationary frame 35 and struck by a hammer 54 each time the reservoir 1 is filled.

The hammer 54 has a short arm 55 against which an actuator 56 pivoted to the frame as at 56a is urged by a spring 57.

The actuator 56 has a cam 58 pivoted thereto as at 58a which is engaged by a pin 59 secured to the movable frame 36.

As the pressure in the reservoir 1 urges the frame 36 forwardly, the pin 59 forces the cam 58 and the actuator 56 downwardly against the action of the spring 57.

Before the frame 36 reaches the limit of its outward movement, the pin 59 passes beyond the high point of the cam 58 which swings upon its pivot 58a and permits the spring 57 to jerk the actuator 56 against the short arm 55 and cause the hammer 54 to strike the bell 53.

When the frame 36 is returned by the spring 27 the cam 58 is swung upon its pivot by the pin 59 so that the actuator 56 and the hammer 54 are not operated.

Each filling of the reservoir 1 may be registered upon a counting or tabulating mechanism 60 which is connected by a link 61 to one arm of a bell crank lever 62, the other arm of which is engaged by the pin 59 during each reciprocation of the movable frame 36.

The lever 62 is pivoted upon a bracket 63 which is carried by the stationary frame 35.

Figure 6:
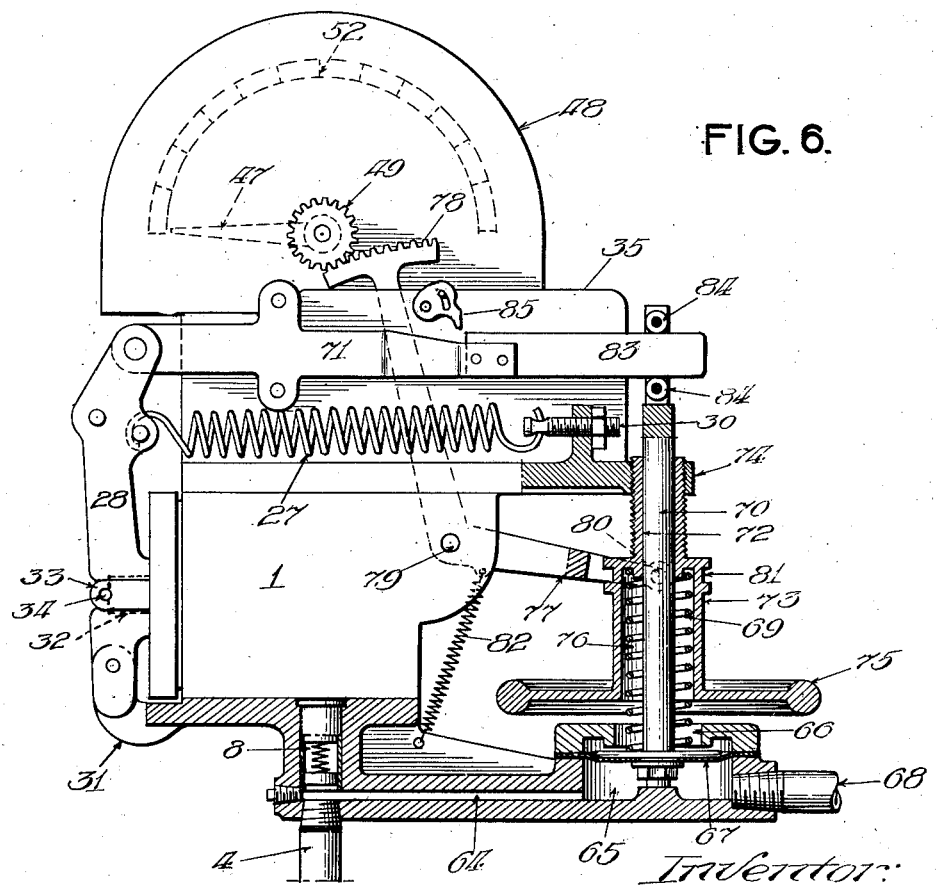
Fig. 6 is a rear view, partly in section and partly in elevation, of a modified form of fluid meter.

*Fig. 6*

The operating mechanism of this meter is the same as that of the meter shown in Figs. 1 to 5 and like parts are indicated by the same reference numerals.

The regulating mechanism differs from the regulating mechanism shown in Figs. 1 to 5 and the meter is positively locked against operation after the ultimate pressure has been obtained in the receiver.

The intermediate reservoir 1 has its outlet valve 8 controlling an outlet 64 which opens into a pressure chamber 65 having an opening 66 in the top thereof which is closed by a diaphragm 67.

The pressure chamber 65 communicates with a discharge pipe 68 which may be connected to a receiver or a distributing system, and the fluid pressure upon the underside of the diaphragm 67 is the same as that in the discharge pipe 68.

The fluid pressure upon the diaphragm 67 is opposed by a helical compression spring 69 and the weight of a plunger 70 and a movable frame 71.

The plunger 70 extends through and is guided by the bore 72 of a hollow adjusting screw 73 which has its upper end threaded through a flange 74 carried by the top of the reservoir 1.

The adjusting screw 73 has a hand wheel 75 for rotating the same to vary the compression of the spring 69 which encircles the plunger 70 and has its upper end arranged in a counterbore 76 and abutting the inner end thereof.

The movement of the adjusting screw 73 is transmitted to the pointer 47 by a bent lever 77 which has a segmental gear 78 upon the upper end thereof in mesh with the gear 49.

The lever 77 is supported by the reservoir 1 upon a pivot 79 and has its lower end bifurcated and provided with pins 80 which ride in a groove 81 formed in the adjusting screw 73.

Rotation of the hand wheel 75 to raise or lower the adjusting screw 73 and vary the compression of the spring 69 causes the lever 77 to be swung upon its pivot by the pins 80 and the gear 49 to be rotated by the segmental gear 78 to swing the pointer 47 to the graduation upon the scale 52 representing the fluid pressure required in the chamber 65 to distend the diaphragm 67 and raise the plunger 70.

In order that the pointer 47 may accurately indicate the ultimate pressure which may be obtained, a tension spring 82 has one end connected to the base of the reservoir 1 and its other end connected to the lever 77 to prevent any lost motion therein.

When the meter has delivered a sufficient quantity of fluid to the receiver to produce therein the pressure indicated by the pointer 47, the diaphragm 67 and the plunger 70 are forced upwardly against the action of the spring 69 to lock the meter against further operation.

The meter is locked by the movable frame 71, which corresponds to the movable frame 36 of the meter shown in Figs. 1 to 4, being held against forward movement under the influence of the fluid pressure in the chamber 1.

The rear end of the frame 71 has a bar 83 rigidly secured thereto and supported between two rollers 84 carried by the upper end of the plunger 70, and the bar 83 reciprocates between these rollers during each cycle of operation.

When the sufficient pressure has been created in the chamber 65 to distend the diaphragm 67 and move the plunger 70 upwardly, the bar 83 is raised and the forward end thereof engages a latch 85 which is pivoted upon the stationary frame 35 and holds the movable frame 71 against forward movement.

Whenever the pressure in the receiver and in the chamber 65 falls below that indicated by the pointer 47, the spring 69 moves the plunger 70 downwardly and the rollers 84 move the bar 83 out of engagement with the latch 85 and unlock the meter.

The invention herein set forth is susceptible of various modifications and adaptations without departing from the scope thereof as hereafter claimed.

The invention is hereby claimed as follows:

1. A fluid meter, comprising a single unit receiving reservoir having an opening in one side thereof, an inlet valve adapted to connect said reservoir to a source of fluid under pressure, an outlet valve adapted to connect said reservoir to a receiver, valve operating mechanism arranged in said reservoir to operate said valves alternately, a diaphragm closing the opening in said reservoir and connected to said mechanism to operate the same in one direction under the influence of fluid pressure in said reservoir, a pivoted operating lever to exert pressure upon the outside of said diaphragm in opposition to said fluid pressure, an operating spring urging said lever toward said diaphragm to operate said mechanism in the opposite direction, a movable frame pivoted to said operating lever and reciprocated thereby, and a regulating spring opposing the movement of said frame during a portion of the movement of said frame and assisting the fluid pressure in said reservoir to counter-balance the action of said operating spring.

2. A fluid meter, comprising a single unit receiving reservoir having an opening in one side thereof, an inlet valve adapted to connect said reservoir to a source of fluid under pressure, an outlet valve adapted to connect said reservoir to a receiver, valve operating mechanism arranged in said reservoir to operate said valves alternately, a diaphragm closing the opening in said reservoir and connected to said mechanism to operate the same in one direction under the influence of fluid pressure in said reservoir, a pivoted operating lever to exert pressure upon the outside of said diaphragm in opposition to said fluid pressure, an adjustable operating spring urging said lever toward said diaphragm to operate said mechanism in the opposite direction, a movable frame pivoted to said operating lever and reciprocated thereby, a regulating spring opposing the movement of said frame during a portion of the movement of said frame and assisting the fluid pressure in said reservoir to counterbalance the action of said operating spring, and means to adjust the tension of said regulating spring to vary the pressure required in said reservoir to hold said diaphragm against movement by said operating spring.

3. A fluid meter, comprising a single unit receiving reservoir having an opening in one side thereof, an inlet valve adapted to connect said reservoir to a source of fluid under pressure, an outlet valve adapted to connect said reservoir to a receiver, valve operating mechanism arranged in said reservoir to operate said valves alternately, a diaphragm closing the opening in said reservoir and connected to said mechanism to operate the same in one direction under the influence of fluid pressure in said reservoir, a pivoted operating lever to exert pressure upon the outside of said diaphragm in opposition to said fluid pressure, an adjustable operating spring urging said lever toward said diaphragm to operate said mechanism in the opposite direction, a movable frame pivoted to said operating lever and reciprocated thereby, a regulating spring opposing the first part of the movement of said frame in one direction and assisting the fluid pressure in said reservoir to counterbalance the action of said operating spring, means to adjust the tension of said regulating spring to vary the pressure required in said reservoir to hold said diaphragm against movement by said operating spring, and means to remove the influence of said regulating spring from said frame during the remainder of its movement in said direction.

4. A fluid meter, comprising a single unit measuring reservoir having means to connect it to a source of fluid under pressure, a delivery tube connected to said reservoir, an inlet valve interposed between said reservoir and said source, an outlet valve interposed between said reservoir and said tube, means for causing a predetermined maximum pressure in the reservoir lower than the pressure at the source, and valve operating means arranged within said reservoir and responsive to said predetermined high pressure in said reservoir which is lower than the pressure at said source to close said inlet valve and open said outlet valve and responsive to a predetermined pressure lower than the maximum pressure in said reservoir to close said outlet valve and open said inlet valve to thereby deliver successive measured charges of compressed fluid from said source to said tube.

5. A fluid meter, comprising a single unit measuring reservoir having means to connect it to a source of fluid under pressure, a delivery tube connected to said reservoir, an inlet valve interposed between said reservoir and said source, an outlet valve interposed between said reservoir and said tube, means for causing a predetermined maximum pressure in the reservoir lower than the pressure at the source, valve operating means arranged within said reservoir and responsive to said predetermined high pressure in said reservoir which is lower than the pressure at said source to close said inlet valve and open said outlet valve and responsive to a predetermined pressure lower than the maximum pressure in said reservoir to close said outlet valve and open said inlet valve to thereby deliver successive measured charges of compressed fluid from said source to said tube, and means to indicate each filling of said reservoir.

6. A fluid meter, comprising a single unit measuring reservoir having means to connect it to a source of fluid under pressure and to a receiver, a self-closing inlet valve interposed between said reservoir and said source, a self-closing outlet valve interposed between said reservoir and said receiver, means for causing a predetermined maximum pressure in the reservoir lower than at the source, and valve operating means arranged within said reservoir and responsive to said fluid pressure therein to open said valves alternately to allow compressed fluid from said source to alternately fill said reservoir and be discharged into said receiver.

7. A fluid meter, comprising a single unit measuring reservoir having means to connect it to a source of fluid under pressure and to a receiver, a self-closing inlet valve interposed between said reservoir and said source, a self-closing outlet valve interposed between said reservoir and said receiver, means for causing a predetermined maximum pressure in the reservoir lower than the pressure at the source, valve operating means arranged within said reservoir and responsive to said fluid pressure therein to open said valves alternately to allow compressed fluid from said source to alternately fill said reservoir and be discharged into said receiver, and means to indicate each filling of said reservoir.

8. A fluid meter, comprising a single unit measuring reservoir having means to connect it between a source of compressed fluid and a receiver, an inlet valve interposed between said reservoir and said source, an outlet valve interposed between said reservoir and said receiver, means for causing a predetermined maximum pressure in the reservoir lower than the pressure at the source, and means arranged within said reservoir and responsive to said fluid pressure therein to operate said valves to alternately admit compressed fluid into said reservoir and exhaust it into said receiver and thereby deliver compressed fluid from said source to said receiver in successive measured charges.

9. A fluid meter, comprising a single unit measuring reservoir having means to connect it between a source of compressed fluid and a receiver, an inlet valve interposed between said reservoir and said source, an outlet valve interposed between said reservoir and said receiver, means for causing a predetermined maximum pressure in the reservoir lower than the pressure at the source, means arranged within said reservoir and responsive to the fluid pressure therein to operate said valves to alternately admit compressed fluid into said reservoir and exhaust it into said receiver and thereby deliver compressed fluid from said source to said receiver in successive measured charges, and means to indicate each filling of said reservoir.

10. In a pressure regulator, the combination of a single unit measuring reservoir having a movable wall, a lever within said reservoir movable by displacement of said wall, valve mechanism operable by said lever with a snap action upon the attainment of predetermined maximum and minimum pressure limits within said reservoir, a second lever disposed outside of said reservoir, subjected to the pressure of fluid supplied to said reservoir and cooperating with said first mentioned lever, and means cooperating with said second lever for varying the limits of pressure attainable within said reservoir.

11. In a pressure regulator, a casing forming a single unit measuring reservoir interposed between a source of high pressure fluid and a receiver and having a movable wall, an inlet valve for controlling the flow of fluid from the source to said reservoir, an outlet valve for controlling the flow of fluid from said reservoir to the receiver, mechanism in said reservoir interposed between said wall and said valves for actuating said valves with a snap action upon attainment of predetermined minimum and maximum pressures in said reservoir, said mechanism being responsive to a predetermined low pressure in said reservoir to close said outlet valve and open said inlet valve and being responsive to a predetermined higher pressure in said reservoir to close said inlet valve and open said outlet valve and thereby deliver successive measured quantities of fluid at a predetermined pressure from the source through said reservoir to the receiver, and adjustable means coacting with said wall for predetermining the pressures available in said reservoir.

GEORGE A. KNAAK.